(12) United States Patent
Mo

(10) Patent No.: US 12,197,707 B2
(45) Date of Patent: Jan. 14, 2025

(54) CONTENT SHARING METHOD AND APPARATUS, DEVICE, AND STORAGE MEDIUM

(71) Applicant: GUANGDONG OPPO MOBILE TELECOMMUNICATIONS CORP., LTD., Dongguan (CN)

(72) Inventor: Boyu Mo, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 18/199,639

(22) Filed: May 19, 2023

(65) Prior Publication Data
US 2023/0289043 A1    Sep. 14, 2023

Related U.S. Application Data

(63) Continuation of application No. PCT/CN2021/117774, filed on Sep. 10, 2021.

(30) Foreign Application Priority Data

Nov. 19, 2020   (CN) .......................... 202011305341.1

(51) Int. Cl.
G06F 3/048     (2013.01)
G06F 3/04817   (2022.01)
G06F 3/0484    (2022.01)

(52) U.S. Cl.
CPC ........ G06F 3/0484 (2013.01); G06F 3/04817 (2013.01)

(58) Field of Classification Search
CPC .......................... G06F 3/0484; G06F 3/04817
See application file for complete search history.

(56) References Cited

U.S. PATENT DOCUMENTS 8,577,975 B2    11/2013  Groves et al.
10,019,133 B1*   7/2018  McNeill ................. H04L 51/56
(Continued)

FOREIGN PATENT DOCUMENTS

CN    102460370 A    5/2012
CN    107590006 A    1/2018
(Continued)

OTHER PUBLICATIONS

International Search Report and Written Opinion dated Nov. 18, 2021 in International Application No. PCT/CN2021/117774. English translation attached.
(Continued)

*Primary Examiner* — David Phantana-angkool
(74) *Attorney, Agent, or Firm* — Sheppard, Mullin, Richter & Hampton LLP

(57) ABSTRACT

Embodiments of the present disclosure disclose a content sharing method and apparatus, a device, and a storage medium. The method is applied in an electronic device including a display screen. The method includes: adjusting a display mode of a first application interface in response to a moving operation on a target icon in the first application interface; and sharing a target content corresponding to the target icon to a first object when an end point of the moving operation corresponds to the first object, in response to ending of the moving operation.

17 Claims, 6 Drawing Sheets

(56) References Cited

U.S. PATENT DOCUMENTS

| | | | |
|---|---|---|---|
| 10,198,178 B2 * | 2/2019 | Sato | G06T 3/40 |
| 11,249,635 B2 * | 2/2022 | Ye | G06F 3/04883 |
| 11,256,408 B2 * | 2/2022 | Xu | G06F 3/04186 |
| 2004/0100497 A1 | 5/2004 | Quillen et al. | |
| 2004/0103156 A1 | 5/2004 | Quillen et al. | |
| 2004/0119758 A1 | 6/2004 | Grossman et al. | |
| 2010/0125806 A1 | 5/2010 | Igeta | |
| 2011/0167122 A1 | 7/2011 | Groves et al. | |
| 2012/0072853 A1 | 3/2012 | Krigstroem et al. | |
| 2012/0198013 A1 | 8/2012 | Quillen et al. | |
| 2013/0080954 A1 | 3/2013 | Carlhian et al. | |
| 2013/0332872 A1 | 12/2013 | Grinberg | |
| 2014/0047349 A1 | 2/2014 | Kulkarni et al. | |
| 2014/0157138 A1 | 6/2014 | Kuscher et al. | |
| 2015/0186008 A1 * | 7/2015 | Hicks | G06F 3/04845 715/765 |
| 2015/0242086 A1 | 8/2015 | Mindlin | |
| 2016/0139776 A1 | 5/2016 | Donahue et al. | |
| 2017/0160896 A1 * | 6/2017 | Donahue | G06F 9/543 |
| 2018/0088784 A1 * | 3/2018 | Zhu | G06F 3/04817 |
| 2019/0222632 A1 | 7/2019 | He | |
| 2019/0244416 A1 * | 8/2019 | Tamaoki | G09G 5/377 |
| 2019/0302979 A1 * | 10/2019 | Klein | G06F 3/04845 |
| 2019/0394149 A1 * | 12/2019 | McNeill | H04L 51/56 |
| 2020/0218694 A1 | 7/2020 | Zeng et al. | |
| 2020/0257425 A1 * | 8/2020 | Ye | G06F 3/0486 |
| 2021/0165670 A1 * | 6/2021 | Pei | G06F 3/04817 |
| 2023/0143275 A1 * | 5/2023 | Opara | G06F 3/04845 715/769 |
| 2023/0289043 A1 * | 9/2023 | Mo | G06F 3/0484 |
| 2023/0297209 A1 * | 9/2023 | Mo | G06F 3/04842 715/764 |
| 2023/0300429 A1 * | 9/2023 | Chen | G06F 3/0482 386/241 |

FOREIGN PATENT DOCUMENTS

| | | |
|---|---|---|
| CN | 107770369 A | 3/2018 |
| CN | 107992263 A | 5/2018 |
| CN | 108182267 A | 6/2018 |
| CN | 109164964 A | 1/2019 |
| CN | 110519461 A | 11/2019 |
| CN | 110622487 A | 12/2019 |
| CN | 110798521 A | 2/2020 |
| CN | 111290675 A | 6/2020 |
| CN | 111857468 A | 10/2020 |
| CN | 111858522 A | 10/2020 |

OTHER PUBLICATIONS

The First Office Action from corresponding Chinese Application No. 202011305341.1, dated Oct. 13, 2023. English translation attached.

International Search Report and Written Opinion dated Jan. 19, 2022 in International Application No. PCT/CN2021/126128. English translation attached.

Tony, "Operations on Tony Dock", "I'm a Mac Handbook for Mac OS X Lion" Aug. 31, 2021, pp. 160-169 (Aug. 31, 2012). English translation attached.

The First Office Action from corresponding Chinese Application No. 202011471717.6, dated Jan. 12, 2024. English translation attached.

Extended European Search Report dated Mar. 11, 2024 received in European Patent Application No. EP21893540.1.

Extended European Search Report dated Mar. 13, 2024 received in European Patent Application No. EP21905311.3.

The Rejection Decision from corresponding Chinese Application No. 202011305341.1, dated Mar. 19, 2024. English translation attached.

The Non-Final Rejection from corresponding U.S. Appl. No. 18/201,132, dated Mar. 28, 2024.

* cited by examiner

CONTENT SHARING METHOD AND APPARATUS, DEVICE, AND STORAGE MEDIUM

CROSS-REFERENCE TO RELATED APPLICATION

This application is a continuation of International Application No. PCT/CN2021/117774, filed on Sep. 10, 2021, which is based on and claims priority to Chinese Patent Application No. 202011305341.1, filed on Nov. 19, 2020, the entire disclosures of which are incorporated herein by reference.

FIELD

Embodiments of the present disclosure relate to electronic technologies, and relate, but are not limited to, a content sharing method and apparatus, a device, and a storage medium.

BACKGROUND

Currently, contents displayable on a display screen of an electronic device (e.g., a smart phone and a tablet computer) are limited by a size of the display screen. Typically, the electronic device displays a display interface of at least one application on the display screen. However, during moving of files or other objects in an application by the user, the display interface of the application will shield other interfaces.

SUMMARY

In view of this, embodiments of the present disclosure provide a content sharing method and apparatus, a device, and a storage medium.

The technical solutions of the embodiments of the present disclosure are implemented as below.

In a first aspect, the embodiments of the present disclosure provide a content sharing method, which is applied in an electronic device including a display screen. The method includes: adjusting a display mode of a first application interface in response to a moving operation on a target icon in the first application interface; and sharing a target content corresponding to the target icon to a first object when an end point of the moving operation corresponds to the first object, in response to ending of the moving operation.

In a second aspect, the embodiments of the present disclosure provide a content sharing apparatus. The apparatus includes: an adjusting unit configured to adjust a display mode of a first application interface in response to a moving operation on a target icon in the first application interface; and a sharing unit configured to share a target content corresponding to the target icon to a first object when an end point of the moving operation corresponds to the first object, in response to ending of the moving operation.

In a third aspect, the embodiments of the present disclosure provide an electronic device. The electronic device includes a memory and a processor. The memory has a computer program executable on the processor stored thereon. The processor, when executing the computer program, implements steps of the above-mentioned content sharing method.

In a fourth aspect, the embodiments of the present disclosure provide a computer-readable storage medium. The computer-readable storage medium has a computer program stored thereon. The computer program, when executed by a processor, implements steps of the above-mentioned content sharing method.

The embodiments of the present disclosure provide the content sharing method and apparatus, the device, and the storage medium. The method includes: adjusting the display mode of the first application interface in response to the moving operation on the target icon in the first application interface; and sharing the target content corresponding to the target icon to the first object when the end point of the moving operation corresponds to the first object, in response to the ending of the moving operation.

DETAILED DESCRIPTION

Figure 1:
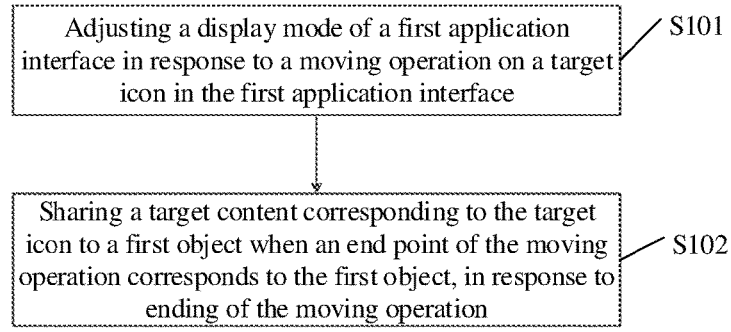
FIG. 1 is a first flowchart of an implementation of a content sharing method according to an embodiment of the present disclosure.

Technical solutions of the present disclosure will be further described in detail below in conjunction with the accompanying drawings and embodiments. Apparently, the embodiments described herein are only part of, rather than all of embodiments of the present disclosure. Based on the embodiments of the present disclosure, other embodiments obtained by those skilled in the art without creative labor shall fall within scope of the present disclosure.

In the following description, reference is made to "some embodiments" which describe a subset of all possible embodiments, but it should be understood that, "some embodiments" may mean a same subset or a different subset of all possible embodiments and may be combined with each other without conflict.

In the following description, suffixes such as "module", "component", or "unit" used for representing elements are merely for the purpose of facilitating description of the present disclosure and contain no specific meaning. Thus, "module", "component", or "unit" may be used interchangeably.

It should be noted that, the terms "first/second/third" involved in the embodiments of the present disclosure merely distinguish similar objects and do not represent a specific ordering of the objects. It should be understood that, a particular order or sequence of the terms "first/second/third" can be interchanged where permitted, to allow the embodiments of the present disclosure described herein to be implemented in an order other than that illustrated or described herein.

The embodiments of the present disclosure provide a content sharing method, which is applied in an electronic device including a display screen. The method includes: adjusting a display mode of a first application interface in response to a moving operation on a target icon in the first application interface; and sharing a target content corresponding to the target icon to a first object when an end point of the moving operation corresponds to the first object, in response to ending of the moving operation.

In some embodiments, the first object is a second application; and the end point of the moving operation corresponding to the first object includes at least one of: a position of the end point of the moving operation being located at a position of an application icon of the second application; the position of the end point of the moving operation being located within an interface of the second application; the position of the end point of the moving operation being located at a position of a shortcut identifier of the second application; or the position of the end point of the moving operation being located at a position of the second application in a quick launch bar.

In some embodiments, the first object is a display object in an interface of a second application; the end point of the moving operation corresponding to the first object includes: a position of the end point of the moving operation being located at a position where the display object is located; and the operation of sharing the target content corresponding to the target icon to the first object includes: sharing the target content corresponding to the target icon to a target corresponding to the display object.

In some embodiments, the second application includes a communication application, and the display object includes a contact identifier; and the operation of sharing the target content corresponding to the target icon to the target corresponding to the display object includes: sharing the target content corresponding to the target icon to a contact corresponding to the contact identifier.

In some embodiments, the contact identifier includes at least one of a contact profile picture, a contact number, a contact chat list item, or a contact chat page.

In some embodiments, the second application includes a file management application, and the display object includes an identifier of a file folder; and the operation of sharing the target content corresponding to the target icon to the target corresponding to the display object includes: saving the target content corresponding to the target icon to a path where the file folder is located.

In some embodiments, the second application includes a document editing application; and the operation of sharing the target content corresponding to the target icon to the first object includes: saving the target content corresponding to the target icon to a file in a format corresponding to the document editing application.

In some embodiments, the display mode of the first application interface at least includes one of: a size of the first application interface, a shape of the first application interface, a morphology of the first application interface, and a position of the first application interface in the display screen.

In some embodiments, the method further includes: cancelling sharing of the target content when a position of the end point of the moving operation is located within the first application interface, in response to the ending of the moving operation.

In some embodiments, the method further includes: displaying the first application interface on the display screen in a mode adopted prior to said adjusting, after the sharing; or displaying the first application interface on the display screen in a mode adopted prior to said adjusting, after the cancelling of the sharing.

In some embodiments, the method further includes: cancelling sharing of the target content when a position of the end point of the moving operation is located at a position of a title bar of the electronic device, in response to the ending of the moving operation; or cancelling sharing of the target content when a position of the end point of the moving operation is beyond a boundary of the display screen of the electronic device, in response to the ending of the moving operation.

The embodiments of the present disclosure provide the content sharing method applied in the electronic device including the display screen. Functions achieved by the method may be achieved through invoking, by a processor in the electronic device, program codes which may be stored in a storage medium of the electronic device. FIG. 1 is a first flowchart of an implementation of a content sharing method according to an embodiment of the present disclosure. As illustrated in FIG. 1, the method includes operations at the following blocks.

At block S101, a display mode of a first application interface is adjusted in response to a moving operation on a target icon in the first application interface.

Here, the electronic device may be various types of devices having an information processing capability, such as a mobile phone, a Personal Digital Assistant (PDA), a navigator, a digital phone, a video phone, a smart watch, a smart bracelet, a wearable device, a tablet computer, an all-in-one PC, etc.

In the embodiments of the present disclosure, the first application interface may be any interface of a first application. For example, when the first application is a communication application, the first application interface may be a contact list interface, a chat interface, etc.; and when the first application is a file management application, the first application interface may be a file folder list interface, a file list interface, etc. Of course, the first application interface further includes an interface of the first application displayed in a mode of a "bubble", a "floating window", etc. That is to say, the display mode of the first application interface is not limited in the embodiments of the present disclosure.

Correspondingly, the target icon may be an icon corresponding to any content in the first application interface. For example, when the first application interface is the contact list interface, the target icon may be an icon corresponding to a name card of a contact. When the first application interface is the chat interface, the target icon may be an icon corresponding to information such as a file, a picture, a video, etc., present in the chat interface. When the first application interface is the file folder list interface, the target content may be an icon corresponding to a file folder.

The first application interface may be displayed on the display screen of the electronic device in a mode of a floating window or in a full-screen mode.

The operation at block S101 of adjusting the display mode of the first application interface in response to the moving operation on the target icon in the first application interface may be implemented by: adjusting the display mode of the first application interface when a moving distance of the moving operation is greater than or equal to a predetermined distance, in response to the moving operation on the target icon in the first application interface.

The moving operation is an operation that causes the target icon to move on the display screen. Correspondingly, adjusting the display mode of the first application interface in response to the moving operation on the target icon in the first application interface may be adjusting the display mode of the first application interface as soon as the moving operation occurs, or adjusting the display mode of the first application interface after the moving operation has realized a certain moving distance. For example, the display mode of the first application interface is adjusted when the target icon is moved outside the first application interface.

In the embodiments of the present disclosure, the display mode of the first application interface at least includes: a size of the first application interface, a shape of the first application interface, a morphology of the first application interface, a position of the first application interface in the display screen, etc. Here, the size of the first application interface refers to dimensions of the first application interface. For example, the size of the first application interface is 15 cm*10 cm (centimeter) before the target icon is moved, and the size of the first application interface is adjusted to 5 cm*1 cm in response to the moving operation on the target icon in the first application interface. The morphology of the first application interface refers to a display state specific to the first application interface itself, e.g., chat bubbles of WeChat, floating windows of some downloadable applications, etc. Correspondingly, adjusting the display mode of the first application interface to display the first application interface on the display screen in a mode different from that adopted prior to said adjusting may be adjusting a mode of displaying the first application interface from a full-screen window mode to a floating window mode. The position of the first application interface in the display screen refers to coordinate information of the first application interface in the display screen. For example, coordinates of a center point of the first application interface in the display screen are (x=750, y=1,250) before the target icon is moved, and the coordinates of the center point of the first application interface in the display screen are adjusted to (x=1,400, y=2,500) in response to the moving operation on the target icon in the first application interface.

Correspondingly, adjusting the display mode of the first application interface may be adjusting the position of the first application interface in the display screen only, or adjusting both the position of the first application interface in the display screen and the size of the first application interface. That is to say, adjusting the display mode of the first application interface in the embodiments of the present disclosure may be adjusting one or more contents of the display mode of the first application interface. A specific adjusted content of the display mode is not limited in the embodiments of the present disclosure.

For example, the first application interface is displayed on the display screen of the electronic device in a mode of a full-screen window, and when an icon of an object in the first application is selected and dragged more than 2 cm, the first application interface is changed from a display mode of a full-screen window to a display mode of a circular floating window, and displayed in a lower right corner of the display screen.

At block S102, a target content corresponding to the target icon is shared to a first object when an end point of the moving operation corresponds to the first object, in response to ending of the moving operation.

In some embodiments, the method further includes: displaying the first application interface on the display screen in a mode adopted prior to the adjustment, after the sharing. For example, the coordinates of the center point of the first application interface in the display screen are (x=750, y=1, 250) before the target icon is moved, and the coordinates of the center point of the first application interface in the display screen are adjusted to (x=1,400, y=2,500) in response to the moving operation on the target icon in the first application interface. After the moving operation ends and the target content corresponding to the target icon is shared to the first object, the coordinates of the first application interface in the display screen are restored to the position (x=750, y=1,250) prior to the adjustment.

When the display screen is a touch screen, and the moving operation is a touch moving operation on the touch screen, the ending of the moving operation may be that a displacement of the moving operation on the touch screen remains unchanged for a period of time. Or, the ending of the moving operation may be a lift operation performed after movement for a certain distance; and correspondingly, the end point of the moving operation may be a position of a coordinate point corresponding to the lift operation. Or, the moving operation may be an air gesture moving operation in front of the display screen of the electronic device, in which case the ending of the moving operation may be that the moving operation reaches standstill in a range in front of the display screen for a period of time, or that an ending gesture of the moving operation shows up after movement for a distance by the moving operation. For example, when a user makes a gesture of opening his/her hand after movement for a distance in front of the display screen, this indicates the ending of the moving operation. A corresponding position of the gesture of opening the hand in the display screen is an end point of the air gesture moving operation.

In the embodiments of the present disclosure, the end point of the moving operation corresponding to the first object may be that the end point of the moving operation is located within a region associated with the first object. For example, when the first object is a document editing application (APP, a software application), the end point of the moving operation corresponding to the first object means that the end point of the moving operation is located within an editing region of the document editing APP. For example, when the first object is a chat list within a chat display interface of WeChat, the end point of the moving operation corresponding to the first object means that the end point of the moving operation is located on the chat list.

In the embodiments of the present disclosure, the display mode of the first application interface is adjusted in response to the moving operation on the target icon in the first application interface; and the target content corresponding to the target icon is shared to the first object when the end point of the moving operation corresponds to the first object, in response to the ending of the moving operation. In this way, the first application interface will not shield other interfaces, which enables quick and accurate content sharing and avoids an incorrect touch operation.

Figure 2A:
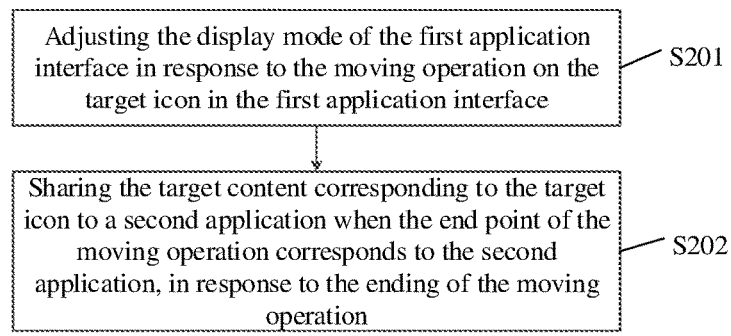
FIG. 2A is a second flowchart of an implementation of a content sharing method according to an embodiment of the present disclosure.

Based on the above-mentioned embodiments, an embodiment of the present disclosure further provides a content sharing method, applied in an electronic device including a display screen. FIG. 2A is a second flowchart of an implementation of a content sharing method according to an embodiment of the present disclosure. As illustrated in FIG. 2A, the method includes operations at the following blocks.

At block S201, the display mode of the first application interface is adjusted in response to the moving operation on the target icon in the first application interface.

At block S202, the target content corresponding to the target icon is shared to a second application when the end point of the moving operation corresponds to the second application, in response to the ending of the moving operation.

For example, the second application is a document editing application, and a selection prompt box may pop up in response to the end point of the moving operation being located at a position of a shortcut identifier of the document editing application, to display names of all documents that the user has opened, allowing the user to select a to-be-shared target document. The target content corresponding to the target icon is shared, in response to the user selecting one of the documents, to the target document selected by the user. Or, when no document is currently opened, the electronic device may open the document editing application and create a new document to record the target content corresponding to the target icon.

In some embodiments, the end point of the moving operation corresponding to the second application includes at least one of: a position of the end point of the moving operation being located at a position of an application icon of the second application; the position of the end point of the moving operation being located within an interface of the second application; the position of the end point of the moving operation being located at a position of a shortcut identifier of the second application; or the position of the end point of the moving operation being located at a position of the second application in a quick launch bar.

The second application may be a system application, such as a camera gallery. The second application may alternatively be a third-party application, e.g., WeChat. For example, the second application is the camera gallery; when the user selects the target content and starts to move the target icon corresponding to the target content, the first application interface is scaled down and placed in the lower right corner of the display screen to display the first application interface on the display screen in a mode different from that adopted prior to the adjustment; and when the target icon continues moving to a position of an icon of the camera gallery and the user performs a lift operation, the target content corresponding to the target icon is shared to the camera gallery. For example, the second application is the camera gallery and the camera gallery is in an open state; when the user selects the target icon and starts to move the target icon, the first application interface is displayed in a "bubble" state in response to the target icon being moved beyond a boundary of the first application interface; and the target content corresponding to the target icon is shared to the file folder in response to the target icon being moved further to a file folder within a display interface of the camera gallery and the user performing a lift operation.

In the embodiments of the present disclosure, the display mode of the first application interface is adjusted in response to the moving operation on the target icon in the first application interface, and the target content corresponding to the target icon is shared to the second application when the end point of the moving operation corresponds to the second application, in response to the ending of the moving operation. In this way, the first application interface will not shield the second application, which enables quick and accurate sharing of the to-be-shared target content in the first application to the second application.

Based on the above-mentioned embodiments, an embodiment of the present disclosure further provides a content sharing method, applied in an electronic device including a display screen. The method includes operations at the following blocks.

At block S211, the display mode of the first application interface is adjusted in response to the moving operation on the target icon in the first application interface.

At block S212, the target content corresponding to the target icon is shared to a second application when the end point of the moving operation corresponds to the second application, in response to the ending of the moving operation.

At block S213, the second application includes a document editing application; and correspondingly, the operation of sharing the target content corresponding to the target icon to the second application includes: saving the target content corresponding to the target icon to a file in a format corresponding to the document editing application.

In some embodiments, the method further includes: displaying the first application interface on the display screen in a mode adopted prior to the adjustment after the target content corresponding to the target icon is saved to the file in the format corresponding to the document editing application.

For example, the first application is the camera gallery, and the target icon is an icon corresponding to a target picture. The display interface of the camera gallery is scaled down and placed in the lower right corner of the display screen, in response to the user selecting the target icon and performing a drag operation. The target picture is shared to a file in a format corresponding to an opened document editing application, in response to the user dragging the target icon to the file in the format corresponding to the opened document editing application. After the sharing is completed, the display interface of the camera gallery is restored to a size prior to the drag operation, and the display interface of the camera gallery is restored to a position prior to the drag operation.

Figure 2B:
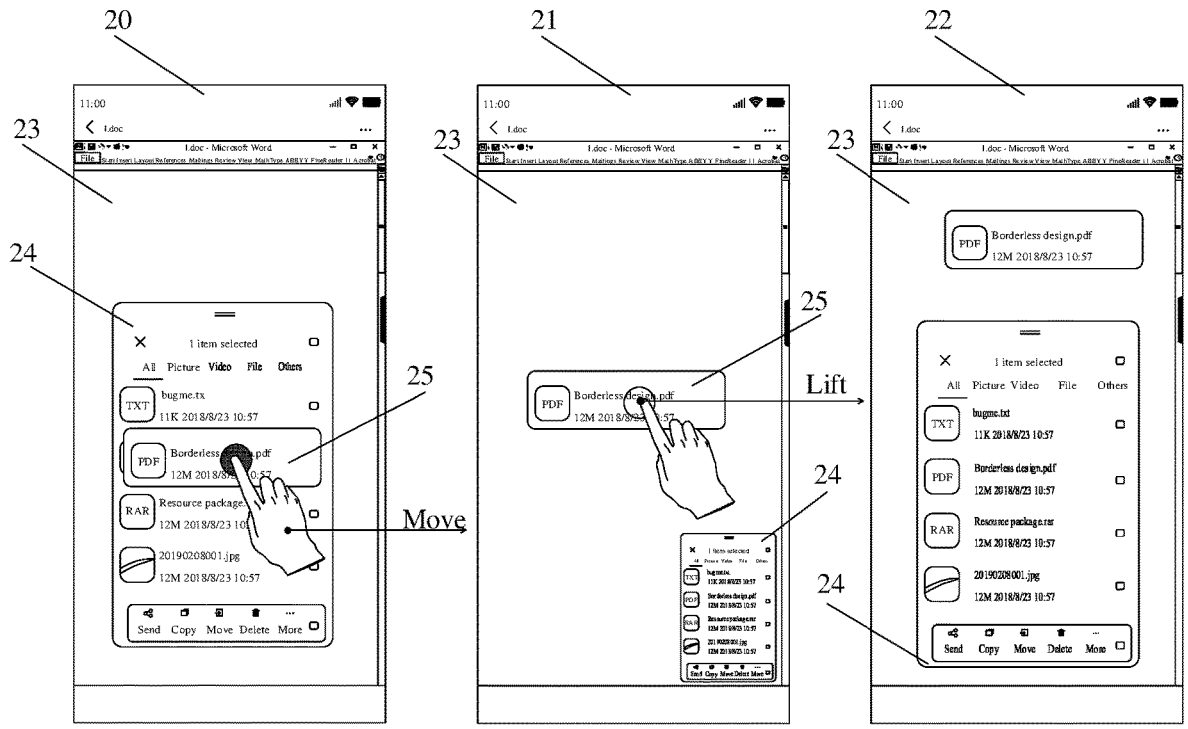
FIG. 2B is a first schematic diagram of an application scenario of a content sharing method according to an embodiment of the present disclosure.

FIG. 2B is a first schematic diagram of an application scenario of a content sharing method according to an embodiment of the present disclosure. As illustrated in FIG. 2B, in a picture 20, a first application interface 24 and a second application 23 are displayed on the display screen of the electronic device. The second application 23 is the document editing application, and the user determines a target icon 25 corresponding to the target content in the first application interface 24 by a touch-and-press operation. In this way, the user may perform the moving operation on the selected target icon 25. In this case, the display mode of the first application interface is adjusted in response to the moving operation to display the first application interface on the display screen in a mode different from that adopted prior to the adjustment: the first application interface 24 is scaled down and placed in the lower right corner of the display screen. The adjusted interface is illustrated in a picture 21. When the position of the end point of the moving operation is located within a display interface of the second application 23 (including that an interface of the target icon 25 is partially or entirely located within the display interface of the second application 23) and the user performs a lift operation, the target content corresponding to the target icon 25 is shared to the second application 23, and at the same time, the first application interface 24 is displayed on the display screen in a mode adopted prior to the adjustment (i.e., the first application interface 24 is scaled up to a size prior to the adjustment, and a position of the first application interface 24 on the display screen is moved to a position prior to the adjustment). The interface after the sharing is completed is illustrated in a picture 22.

Figure 3A:
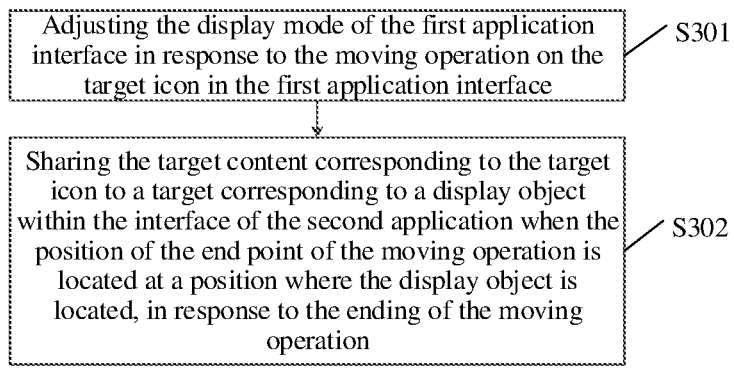
FIG. 3A is a third flowchart of an implementation of a content sharing method according to an embodiment of the present disclosure.

Based on the above-mentioned embodiments, an embodiment of the present disclosure further provides a content sharing method, applied in the electronic device including the display screen. FIG. 3A is a third flowchart of an implementation of a content sharing method according to an embodiment of the present disclosure. As illustrated in FIG. 3A, the method includes operations at the following blocks.

At block S301, the display mode of the first application interface is adjusted in response to the moving operation on the target icon in the first application interface.

At block S302, the target content corresponding to the target icon is shared to a target corresponding to a display object in the interface of the second application when the position of the end point of the moving operation is located at a position where the display object is located, in response to the ending of the moving operation.

In some embodiments, the method further includes, after the sharing: displaying the first application interface on the display screen in a mode adopted prior to the adjustment.

In embodiments of the present disclosure, the display mode of the first application interface is adjusted in response to the moving operation on the target icon in the first application interface; and the target content corresponding to the target icon is shared to the target corresponding to the display object in the interface of the second application when the position of the end point of the moving operation is located at the position where the display object is located, in response to the ending of the moving operation. In this way, the first application interface will not shield the display object in the interface of the second application, which enables quick and accurate sharing of the to-be-shared target content in the first application to the target corresponding to the display object in the interface of the second application.

Based on the above-mentioned embodiments, an embodiment of the present disclosure further provides a content sharing method, applied in the electronic device including the display screen. The method includes the following operations.

At S311, the display mode of the first application interface is adjusted in response to the moving operation on the target icon in the first application interface.

At S312, the target content corresponding to the target icon is shared to the target corresponding to the display object in the interface of the second application when the position of the end point of the moving operation is located at the position where the display object is located, in response to the ending of the moving operation.

At S313, the second application includes a communication application, and the display object includes a contact identifier. Correspondingly, the operation of sharing the target content corresponding to the target icon to the target corresponding to the display object includes: sharing the target content corresponding to the target icon to a contact corresponding to the contact identifier.

In some embodiments, the contact identifier includes at least one of a contact profile picture, a contact number, a contact chat list item, or a contact chat page.

For example, the first application is a file management APP, the target icon is an icon corresponding to a to-be-shared file folder (including files in the file folder), the communication application is WeChat, and the display object is a chat list in a chat interface. An interface of the file management APP is adjusted to be displayed on the display screen in a mode of a floating window, in response to the user selecting an icon corresponding to the file folder and performing a drag operation. The file folder (including the file in the file folder) is shared to a contact corresponding to the chat list, in response to the user dragging the icon corresponding to the file folder onto the chat list. After the sharing is completed, the interface of the file management APP is displayed on the display screen in the mode adopted prior to the adjustment.

Figure 3B:
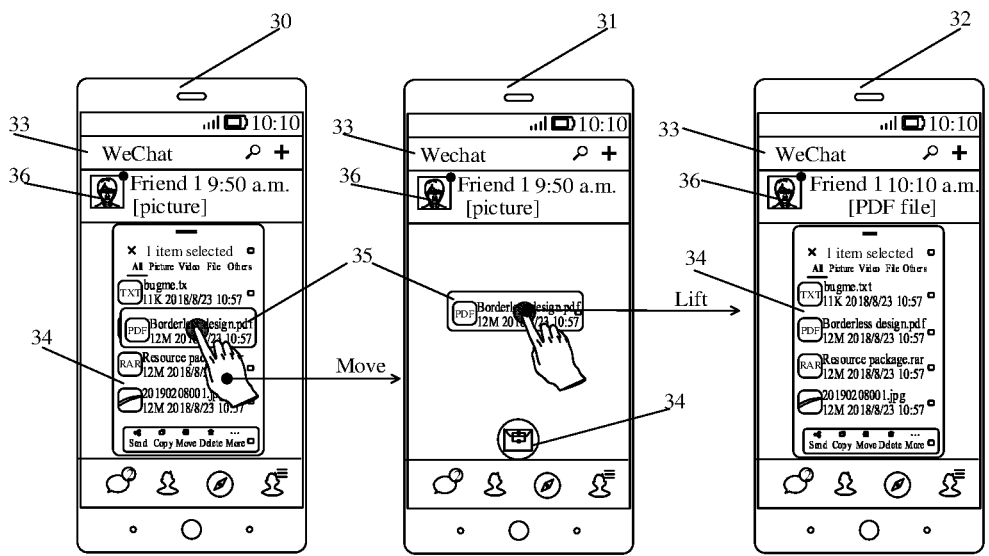
FIG. 3B is a second schematic diagram of an application scenario of a content sharing method according to an embodiment of the present disclosure.

FIG. 3B is a second schematic diagram of an application scenario of a content sharing method according to an embodiment of the present disclosure. As illustrated in FIG. 3B, in a picture 30, a first application interface 34 and a second application 33 are displayed on the display screen of the electronic device. The first application is the file management application and the second application 33 is the communication application. The user determines a target icon 35 in the first application interface 34 by a touch-and-press operation. Then, the user may perform the moving operation on the selected target icon 35. In this case, the first application interface 34 is adjusted from a display mode of a floating window to a display mode of a bubble in response to the moving operation and moved to a lower part of the display screen. The adjusted interface is illustrated in a picture 31. When the position of the end point of the moving operation is located at a position where a contact identifier 36 in the second application 33 is located (including that an interface of the target icon 35 is partially or entirely located at the position where the contact identifier 36 in the second application 33 is located) and the user performs a lift operation, the target content corresponding to the target icon 35 is shared to a contact corresponding to the contact identifier 36, and at the same time, the display mode of the first application interface is restored to the display mode of the floating window. The interface after the sharing is completed is illustrated in a picture 32.

Based on the above-mentioned embodiments, an embodiment of the present disclosure further provides a content sharing method, applied in the electronic device including the display screen. The method includes the following operations.

At S321, the display mode of the first application interface is adjusted in response to the moving operation on the target icon in the first application interface.

At S322, the target content corresponding to the target icon is shared to the target corresponding to the display object in the interface of the second application when the position of the end point of the moving operation is located at the position where the display object is located, in response to the ending of the moving operation.

At S323, the second application includes a file management application, and the display object includes an identifier of a file folder; correspondingly, the operation of sharing the target content corresponding to the target icon to the target corresponding to the display object includes: saving the target content corresponding to the target icon to a path where the file folder is located.

In some embodiments, the method further includes, subsequent to said saving the target content corresponding to the target icon to the path where the file folder is located: displaying the first application interface on the display screen in a mode adopted prior to the adjustment.

For example, the first application is WeChat, and the target icon is an icon corresponding to a video received by the user in a to-be-shared chat interface. A display morphology of WeChat is adjusted to a bubble display morphology in response to the user selecting the icon corresponding to the received video and performing a drag operation. The video is saved, in response to the user dragging the icon corresponding to the video onto a file folder in the file management application, to a path where the file folder is located. After the saving, the display interface of WeChat is restored to the non-bubble display morphology prior to the adjustment.

Figure 3C:
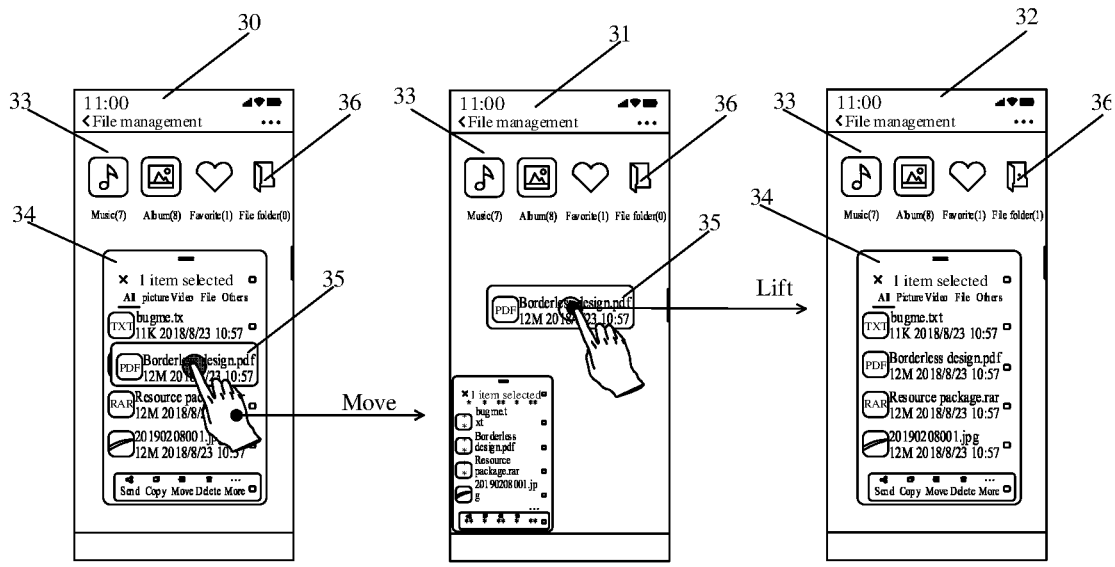
FIG. 3C is a third schematic diagram of an application scenario of a content sharing method according to an embodiment of the present disclosure.

FIG. 3C is a third schematic diagram of an application scenario of a content sharing method according to an embodiment of the present disclosure. As illustrated in FIG. 3C, in the picture 30, the first application interface 34 and the second application 33 are displayed on the display screen of the electronic device. The second application 33 is the file management application, and the user determines the target icon 35 in the first application interface 34 by a touch-and-press operation. In this way, the user may perform the moving operation on the selected target icon 35. In this case, the display mode of the first application interface 34 is adjusted in response to the moving operation, to display the first application interface on the display screen in a mode different from that adopted prior to the adjustment: the first application interface 34 is scaled down and placed in a lower left corner of the display screen. The adjusted interface is illustrated in the picture 31. When the position of the end point of the moving operation is located at a position where an identifier 36 of a file folder in the second application 33 is located (including that the interface of the target icon 35 is partially or entirely located at the position where the identifier 36 of the file folder in the second application 33 is located) and the user performs a lift operation, the content corresponding to the target icon 35 is saved to the path where the identifier 36 of the file folder is located, and at the same time, the first application interface 34 is scaled up to a size prior to the adjustment, and the position of the first application interface 34 on the display screen is moved to a position prior to the adjustment. The interface after the sharing is completed is illustrated in the picture 32.

Figure 4:
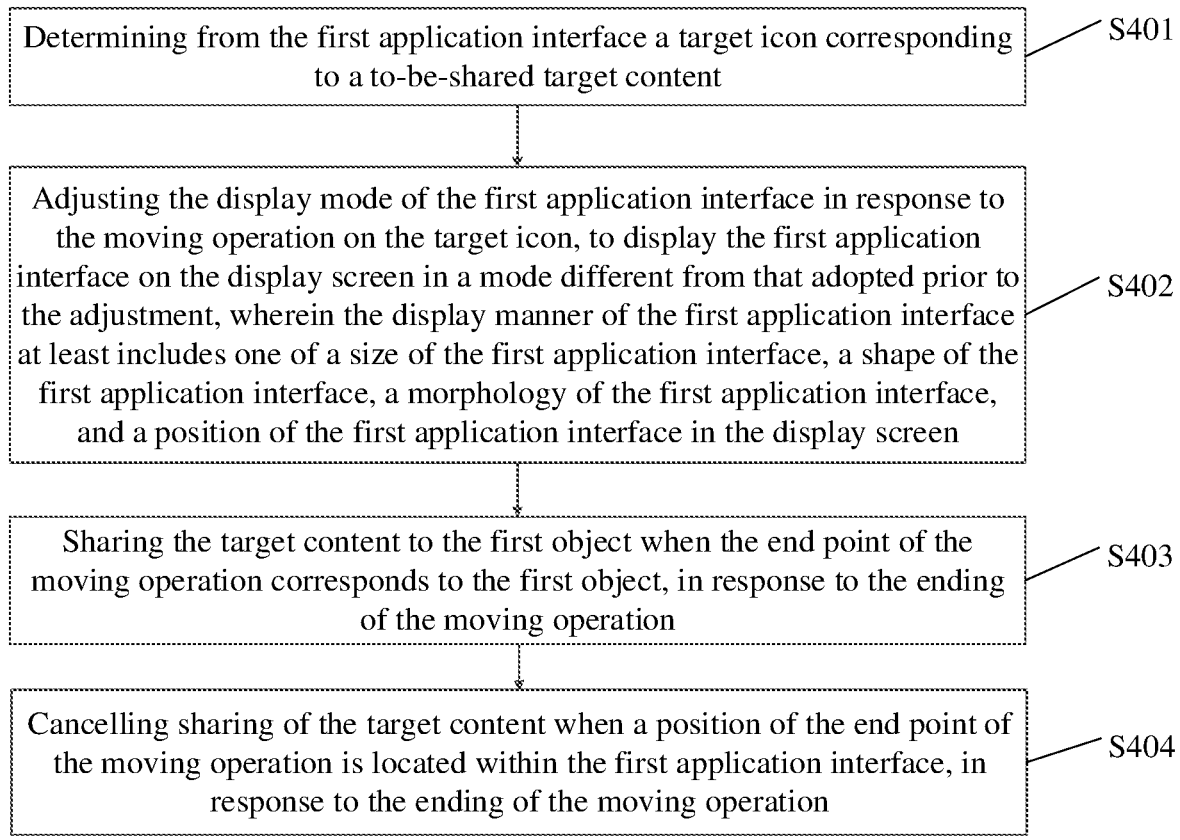
FIG. 4 is a fourth flowchart of an implementation of a content sharing method according to an embodiment of the present disclosure.

Based on the above-mentioned embodiments, an embodiment of the present disclosure further provides a content sharing method, applied in the electronic device including the display screen. FIG. 4 is a fourth flowchart of an implementation of a content sharing method according to an embodiment of the present disclosure. As illustrated in FIG. 4, the method includes operations at the following blocks.

At block S401, a target icon corresponding to a to-be-shared target content is determined in the first application interface.

In some embodiments, at block S401, the operation of determining from the first application interface the target icon corresponding to the to-be-shared target content may be achieved by: for example, the display screen being a touch screen, and obtaining a press operation on the first application interface; determining a to-be-shared target icon in response to a duration of the press operation exceeding a predetermined duration, or determining the to-be-shared target icon in response to the number of consecutive press operations on the first application interface exceeding a predetermined number. The press operation(s) is performed on the target icon.

That is to say, the to-be-shared target icon may be determined by means of press and selection. Moreover, the target icon may be varied. For example, the target icon may be an icon corresponding to a text, a picture, a video, a file, etc.

The to-be-shared target icon may alternatively be determined through a virtual press operation, e.g., a mouse simulated click press, an air gesture, a Virtual Reality (VR) operation, etc. For example, when operating the electronic device, the user may perform a selection in the air, a camera of the electronic device may be used to capture a gesture of the user in front of the display screen, and information such as a shape and a position of the gesture may be identified using algorithms to determine the to-be-shared target icon. Of course, a VR technology can also be used to create a computer simulation system and generate a simulated environment in which objects such as the electronic device are represented by three-dimensional models, allowing the user to determine the to-be-shared target icon from the three-dimensional models.

At block S402, the display mode of the first application interface is adjusted in response to the moving operation on the target icon, to display the first application interface on the display screen in a mode different from that adopted prior to the adjustment. The display mode of the first application interface at least includes one of a size of the first application interface, a shape of the first application interface, a morphology of the first application interface, and a position of the first application interface in the display screen.

At block S403, the target content is shared to the first object when the end point of the moving operation corresponds to the first object, in response to the ending of the moving operation.

At block S404, sharing of the target content is cancelled when a position of the end point of the moving operation is located within the first application interface, in response to the ending of the moving operation.

Here, the position of the end point of the moving operation of the user may be determined. Content sharing is performed upon determining that the end point of the moving operation corresponds to the first object. The sharing is cancelled upon determining that the position of the end point of the moving operation is located within the first application interface.

In the embodiments of the present disclosure, the position of the end point of the moving operation being located within the first application interface may be that the interface of the target icon is partially or entirely located within the first application interface. For example, when the interface of the target icon moved by the user has an intersection with the interface of the first application, it can be considered that the position of the end point of the moving operation is located within the first application interface.

In some embodiments, the method further includes the following operations.

At S41a, sharing of the target content is cancelled when the position of the end point of the moving operation is located at a position of a title bar of the electronic device, in response to the ending of the moving operation.

At S42a, sharing of the target content is cancelled when the position of the end point of the moving operation is beyond a boundary of the display screen of the electronic device, in response to the ending of the moving operation.

It may be considered that a sharing cancelling instruction is received, at the end of the moving operation when the position of the end point of the moving operation is located within the first application interface, or the position of the end point of the moving operation is located on the title bar of the display screen, or the position of the end point of the moving operation is beyond the boundary of the display screen. That is to say, a manner to cancel the sharing is not limited in the embodiments of the present disclosure.

In the embodiments of the present disclosure, the target icon corresponding to the to-be-shared target content is determined from the first application interface; the display mode of the first application interface is adjusted in response to the moving operation on the target icon, to display the first application interface on the display screen in the mode different from that adopted prior to the adjustment, wherein the display mode of the first application interface at least includes one of the size of the first application interface, the shape of the first application interface, the morphology of the first application interface, and the position of the first application interface in the display screen; the target content is shared to the first object when the end point of the moving operation corresponds to the first object, in response to the ending of the moving operation; and the sharing of the target content is cancelled when the position of the end point of the moving operation is located within the first application interface, in response to the ending of the moving operation. In this way, the first application interface will not shield the first object, which enables quick and accurate content sharing and cancellation of the content sharing, avoiding an incorrect touch operation.

Based on the above-mentioned embodiments, an embodiment of the present disclosure further provides a content sharing method, applied in the electronic device including the display screen. The method includes the following operations.

At S411, the target icon corresponding to the to-be-shared target content is determined from the first application interface.

At S412, the display mode of the first application interface is adjusted in response to the moving operation on the target icon, to display the first application interface on the display screen in the mode different from that adopted prior to the adjustment. The display mode of the first application interface at least includes one of the size of the first application interface, the shape of the first application interface, the morphology of the first application interface, and the position of the first application interface in the display screen.

At S413, the target content is shared to the first object when the end point of the moving operation corresponds to the first object, in response to the ending of the moving operation.

At S414, sharing of the target content is cancelled when the position of the end point of the moving operation is located within the first application interface, in response to the ending of the moving operation.

At S415, the first application interface is displayed on the display screen in the mode adopted prior to the adjustment, after the sharing.

At S416, the first application interface is displayed on the display screen in the mode adopted prior to the adjustment, after the cancelling of the sharing.

Whether the target content is shared to the first object or the sharing of the target content is cancelled, the first application interface is displayed on the display screen in the mode adopted prior to the adjustment, after the sharing or the cancelling of the sharing.

In some embodiments, the operation S411 of determining from the first application interface the target icon corresponding to the to-be-shared target content includes the following operations.

At S41b, a press operation on the first application interface is obtained; and the target icon corresponding to the to-be-shared target content is determined in response to a duration of the press operation exceeding a predetermined duration.

At S42b, the target icon corresponding to the to-be-shared target content is determined in response to a number of consecutive press operations on the first application interface exceeding a predetermined number.

Correspondingly, the operation S412 of adjusting the display mode of the first application interface in response to the moving operation on the target icon includes: adjusting the display mode of the first application interface when a moving distance of the moving operation is greater than or equal to a predetermined distance, in response to the moving operation on the target icon.

In the related art, based on Android's native capabilities, the first application may be displayed as an application floating window, and a bottom interface is a page of the second application. In this case, a file in the first application may be shared to the second application through a drag operation. A file in the first application may enter a drag state when the user performs a long press on the file. When the user releases the file within the floating window of the first application, sharing through the drag may be cancelled. When the user releases the file outside a range of the floating window of the first application, a sharing behavior may be triggered, and thus the file may be sent to the second application in a specific form. However, in the related art, when positioning and releasing are required by the user, a task cannot be completed due to shielding by the floating window on the screen, or poor experience is caused.

Therefore, based on the above-mentioned embodiments, an embodiment of the present disclosure provides a method for dragging and sharing a content from a floating window to an application at a bottom. In the method, a user operation is determined. After the user performs a long press to trigger the drag operation, the floating window of the first application is automatically displaced, in response to a sharing object being dragged out of the floating window, downwards to allow the user to see the majority of a layout of the page of the second application, which facilitates casual dragging and positioning of the user. When the user drags the sharing object back to a region of the floating window and then releases the sharing object, sharing may be cancelled, and the floating window will also automatically return to its original position.

Figure 5:
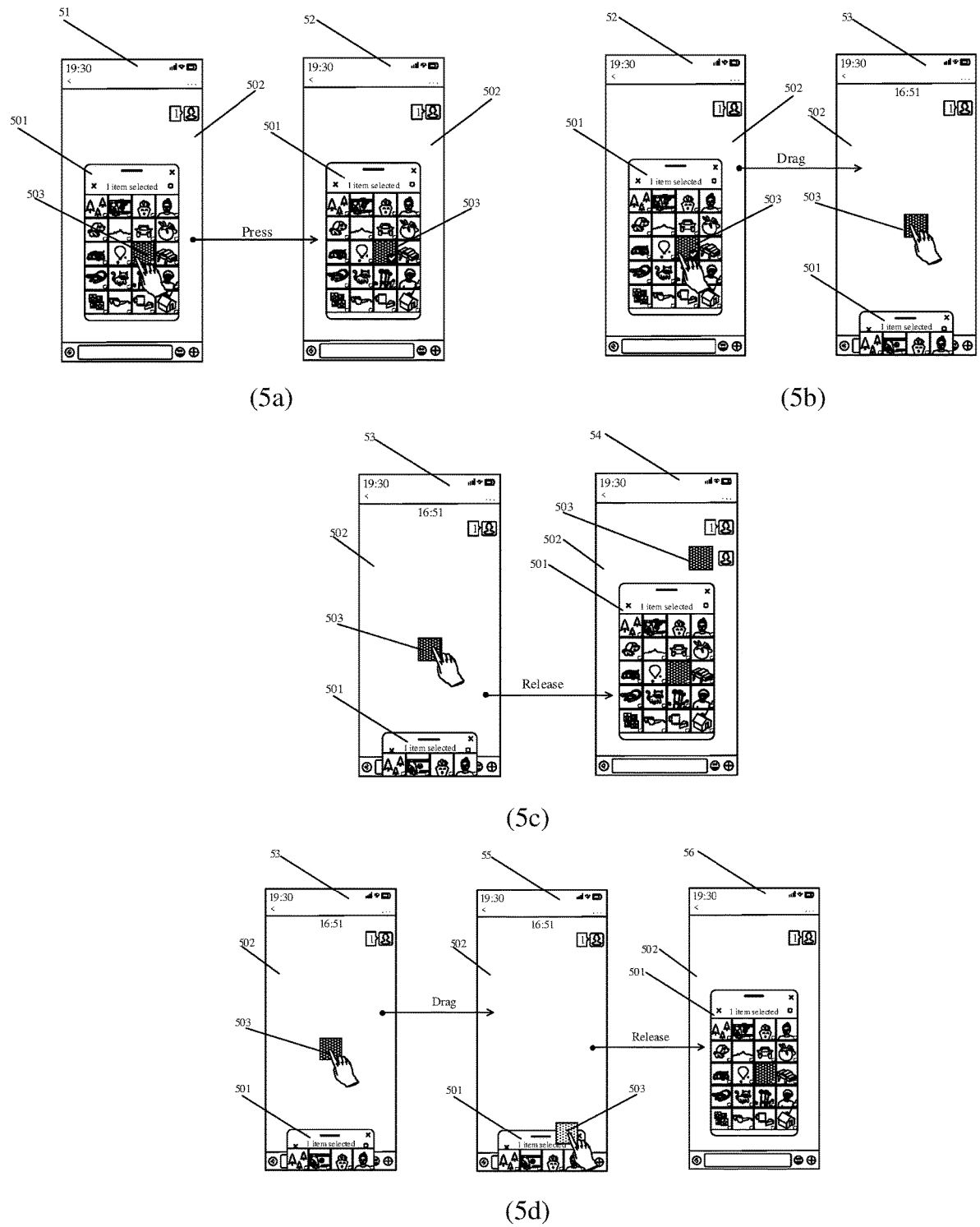
FIG. 5 is a first schematic diagram of an interface operation for content sharing according to an embodiment of the present disclosure.

FIG. 5 is a first schematic diagram of an interface operation for content sharing according to an embodiment of the present disclosure.

As illustrated in (5a) in FIG. 5, in a picture 51, a first application 501 in a category of gallery applications and a second application 502 in a category of communication applications are displayed on the display interface of the electronic device. The first application 501 is displayed on a display interface of the second application 502 in a mode of a floating window.

When the user performs a long press on a to-be-shared photo 503 of the picture 51 for a period of time, or after the user performs two consecutive presses on the to-be-shared photo 503, the display interface changes to an interface illustrated by the picture 52. At this time, the to-be-shared photo 503 is in a selected state.

As illustrated in (5b) in FIG. 5, after the drag operation is triggered by the long press, the user's drag operation is determined. Upon determining that the user drags the to-be-shared photo 503 for more than a distance, as illustrated in an interface of a picture 53, a floating window of the first application 501 is automatically displaced downwards, i.e., a position of the first application 501 in the display screen is changed. In this way, the user can see most of a layout of a page of the second application 502, which facilitates casual dragging and positioning of the user.

As illustrated in (5c) in FIG. 5, in this case, when the user releases the to-be-shared photo 503 within the display interface of the second application 502, as illustrated in an interface of a picture 54, the to-be-shared photo 503 is shared to the second application 502, while the floating window of the first application 501 automatically returns to its original position.

As illustrated in (5d) in FIG. 5, of course, when the user continues dragging the to-be-shared photo 503 and drags the to-be-shared photo 503 into a region where the first application 501 is located, as illustrated in an interface of a picture 55, a color of the to-be-shared photo 503 may be changed or a border may be added to the to-be-shared photo 503, in response to a content of the to-be-shared photo 503 being partially located within the region of the first application 501, to prompt the user that the to-be-shared photo has already been dragged into the region where the first application 501 is located and sharing will be cancelled if the user releases the to-be-shared photo 503. When the user releases the to-be-shared photo 503, as in an interface illustrated in a picture 56, the sharing of the photo is cancelled, and the floating window of the first application 501 automatically returns to its original position.

The embodiments of the present disclosure further provide a method for dragging and sharing a content from a floating window to an application at a bottom. In the method, when the sharing object is dragged out of the floating window, the floating window can not only be displaced, but also be scaled down and placed in a corner, which may also achieve a purpose of reducing the shielding.

Figure 6:
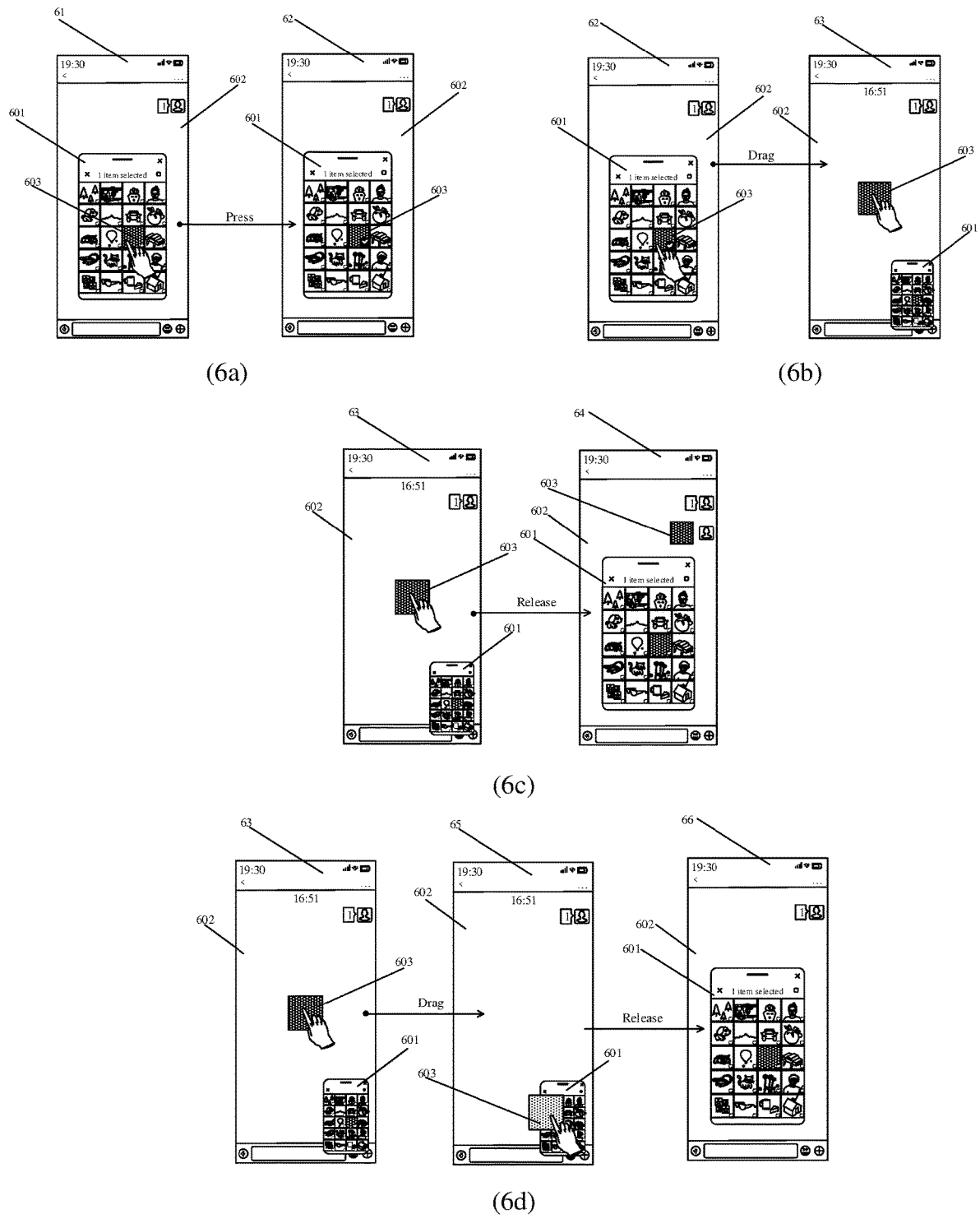
FIG. 6 is a second schematic diagram of an interface operation for content sharing according to an embodiment of the present disclosure.

FIG. 6 is a second schematic diagram of an interface operation for content sharing according to an embodiment of the present disclosure.

As illustrated in (6a) in FIG. 6, in a picture 61, a first application 601 in a category of gallery applications and a second application 602 in a category of communication applications are displayed on the display interface of the electronic device. The first application 601 is displayed on a display interface of the second application 602 in a mode of a floating window.

When the user performs a long press on a to-be-shared photo 603 of the picture 61 for a period of time, or after the user performs two consecutive presses on the to-be-shared photo 603, the display interface changes to an interface illustrated by the picture 62. At this time, the to-be-shared photo 603 is in a selected state.

As illustrated in (6b) in FIG. 6, after the drag operation is triggered by the long press, the user's drag operation is determined. Upon determining that the user drags the to-be-shared photo 603 for more than a distance, as illustrated in an interface of a picture 63, the floating window of the first application 601 is scaled down and placed in the lower right corner of the display screen. In this way, the user can see most of a layout of a page of the second application 602, which facilitates casual dragging and positioning of the user.

As illustrated in (6c) in FIG. 6, in this case, when the user releases the to-be-shared photo 603 within the display interface of the second application 602, as illustrated in an interface of a picture 64, the to-be-shared photo 603 is shared to the second application 602, while the floating window of the first application 601 is automatically changed to its size prior to the adjustment and returns to its original position.

As illustrated in (6d) in FIG. 6, of course, when the user continues dragging the to-be-shared photo 603 and drags the to-be-shared photo 603 into a region where the first application 601 is located, as illustrated in an interface of a picture 65, a color of the to-be-shared photo 603 may be changed or a border may be added to the to-be-shared photo 603, in response to a content of the to-be-shared photo 603 is partially located within the region of the first application 601, to prompt the user that the to-be-shared photo has already been dragged into the region where the first application 601 is located and sharing will be cancelled if the user releases the to-be-shared photo 603. When the user releases the to-be-shared photo 603, as illustrated in an interface of a picture 66, the sharing of the photo is cancelled, and the floating window of the first application 601 automatically returns to its original position.

In the embodiments of the present disclosure, a clever way is used to avoid a problem brought by the existing solution to the user in a process of the sharing through the drag, in such a manner that no unnecessary shielding occurs during the dragging of the user, and the sharing can be cancelled simply and quickly to return to the floating window, solving a scenario problem the user met in the process of the sharing through the drag.

Based on the above embodiments, a content sharing apparatus is provided according to an embodiment of the present disclosure. Various units included in the apparatus, various modules included in each of the units, and components included in each of the modules may be implemented by a processor in the electronic device or by a logic circuit. In an implementation, the processor may be a Central Processing Unit (CPU), a Microprocessor Unit (MPU), a Digital Signal Processor (DSP), or a Field Programmable Gate Array (FPGA), etc.

Figure 7:
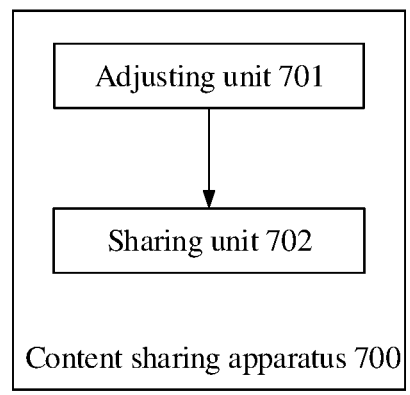
FIG. 7 is a schematic diagram of a composition structure of a content sharing apparatus according to an embodiment of the present disclosure.

FIG. 7 is a schematic diagram of a composition structure of a content sharing apparatus according to an embodiment of the present disclosure. As illustrated in FIG. 7, an apparatus 700 includes an adjusting unit 701 and a sharing unit 702.

The adjusting unit 701 is configured to adjust a display mode of a first application interface in response to a moving operation on a target icon in the first application interface.

The sharing unit 702 is configured to share a target content corresponding to the target icon to a first object when an end point of the moving operation corresponds to the first object, in response to ending of the moving operation.

In some embodiments, the first object is a second application; and the end point of the moving operation corresponding to the first object includes at least one of: a position of the end point of the moving operation being located at a position of an application icon of the second application; the position of the end point of the moving operation being located within an interface of the second application; the position of the end point of the moving operation being located at a position of a shortcut identifier of the second application; or the position of the end point of the moving operation being located at a position of the second application in a quick launch bar.

In some embodiments, the first object is a display object in an interface of a second application; the end point of the moving operation corresponding to the first object includes: a position of the end point of the moving operation being located at a position where the display object is located; and the sharing unit 702 includes a sharing module configured to share the target content corresponding to the target icon to a target corresponding to the display object.

In some embodiments, the second application includes a communication application, the display object includes a contact identifier, and the sharing module includes a first sharing component configured to share the target content corresponding to the target icon to a contact corresponding to the contact identifier.

In some embodiments, the contact identifier includes at least one of a contact profile picture, a contact number, a contact chat list item, or a contact chat page.

In some embodiments, the second application includes a file management application, and the display object includes an identifier of a file folder; and the sharing module includes a second sharing component configured to save the target content corresponding to the target icon to a path where the file folder is located.

In some embodiments, the second application includes a document editing application; and the sharing unit 702 includes a saving module configured to save the target content corresponding to the target icon to a file in a format corresponding to the document editing application.

In some embodiments, the display mode of the first application interface at least includes one of: a size of the first application interface, a shape of the first application interface, a morphology of the first application interface, and a position of the first application interface in the display screen.

In some embodiments, the apparatus further includes a first sharing cancelling unit configured to cancel sharing of the target content when a position of the end point of the moving operation is located within the first application interface, in response to the ending of the moving operation.

In some embodiments, the apparatus further includes a first return unit and a second return unit. The first return unit is configured to display the first application interface on the display screen in a mode adopted prior to said adjusting, after the sharing. The second return unit is configured to display the first application interface on the display screen in a mode adopted prior to said adjusting, after the cancelling of the sharing.

In some embodiments, the apparatus further includes a second sharing cancelling unit and a third sharing cancelling unit.

The second sharing cancelling unit is configured to cancel sharing of the target content when a position of the end point of the moving operation is located at a position of a title bar of the electronic device, in response to the ending of the moving operation.

The third sharing cancelling unit is configured to cancel sharing of the target content when a position of the end point of the moving operation is beyond a boundary of the display screen of the electronic device, in response to the ending of the moving operation.

The above-mentioned apparatus embodiments are described in a similar manner as the above-mentioned method embodiments and can provide similar advantageous effects as the method embodiments. For technical details not disclosed in the apparatus embodiments of the present disclosure, reference can be to the description of the method embodiments of the present disclosure.

It should be noted that, in the embodiments of the present disclosure, when the above-mentioned content sharing method is implemented in the form of a software functional module and is sold or used as a standalone product, it can be stored in a computer-readable storage medium. Based on this understanding, a substantial part of the technical solutions according to the embodiments of the present disclosure, or the part thereof that contributes to the related art, can be embodied in the form of a software product. The computer software product may be stored in a storage medium and contain instructions to enable an electronic device (which may be a personal computer, a server, etc.) to perform all or part of the method described in the embodiments of the present disclosure. The storage medium may include various media capable of storing program codes, such as a Universal Serial Bus (USB) disk, a mobile hard drive, a Read Only Memory (ROM), a magnetic disk, or an optical disc. In this way, the embodiments of the present disclosure are not limited to any particular combination of hardware and software.

Correspondingly, the embodiments of the present disclosure provide an electronic device. The electronic device includes a memory and a processor. The memory has a computer program executable on the processor stored thereon. The processor, when executing the program, implements steps of the content sharing method according to the above embodiments.

Correspondingly, the embodiments of the present disclosure provide a computer-readable storage medium. The computer-readable storage medium has a computer program stored thereon. The computer program, when executed by a processor, implements steps of the content sharing method described above It should be noted that the above-mentioned storage medium embodiments and the above-mentioned device embodiments are described in a similar manner as the above-mentioned method embodiments and can provide similar advantageous effects as the method embodiments. For technical details not disclosed in the storage medium embodiments and the device embodiments of the present disclosure, reference can be to the description of the method embodiments of the present disclosure.

Figure 8:
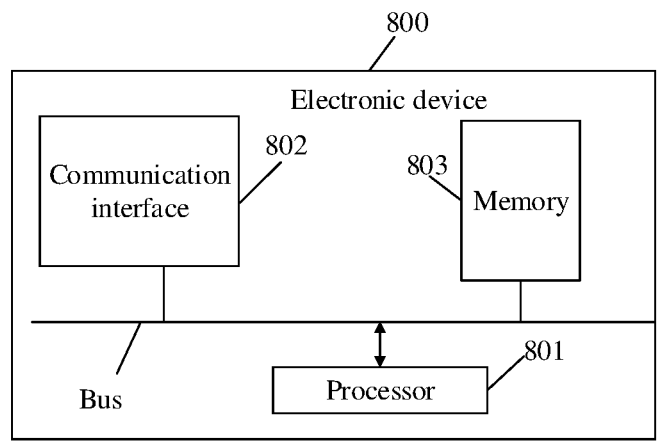
FIG. 8 is a schematic diagram of a hardware entity of an electronic device according to an embodiment of the present disclosure.

It should be noted that FIG. 8 is a schematic diagram of a hardware entity of an electronic device according to an embodiment of the present disclosure. As illustrated in FIG. 8, a hardware entity of an electronic device 800 includes a processor 801, a communication interface 802, and a memory 803.

The processor 801 generally controls an overall operation of the electronic device 800.

The communication interface 802 can enable the electronic device 800 to communicate with other electronic devices or servers via a network.

The memory 803 is configured to store instructions and applications executable by the processor 801, and may also cache data to be processed or already processed by the processor 801 and modules in the electronic device 800 (e.g., image data, audio data, voice communication data, and video communication data), which may be implemented through a flash memory (FLASH) or a Random Access Memory (RAM).

It should be understood that the device and method disclosed in some embodiments provided by the present disclosure can be implemented in other ways. The device embodiments described above are merely exemplary. For example, the units are merely divided based on logic functions. In practical implementation, the units can be divided in other manners. For example, multiple units or components can be combined or integrated into another system, or some features can be omitted or not executed. In addition, mutual coupling or direct coupling or communication connection of individual components shown or discussed can be implemented as indirect coupling or communication connection via some interfaces, devices, or units, and may be electrical, mechanical, or in other forms.

The units illustrated above as separate components may be or not be separated physically, and components shown as units may be or not be physical units, i.e., may be located at one position, or may be distributed onto multiple network units. It is possible to select some or all of the units according to actual needs, for achieving the objective of the solutions of the present disclosure.

In addition, the functional units in the embodiments of the present disclosure may be integrated into one processing module, or alternatively be separate units, or two or more units may be integrated into one unit. The integrated unit may be implemented in the form of hardware, or in the form of a combination of hardware and a software functional unit. It should be understood by those skilled in the art that all or part of the steps implementing the above-mentioned method embodiments may be completed by relevant hardware instructed by a program. The program may be stored in a computer-readable storage medium. When the program is executed, the steps including the above-mentioned method embodiments are executed. The above-mentioned storage medium includes various media capable of storing program codes, such as a mobile storage device, an ROM, an RAM, a magnetic disk, or an optical disc.

The methods disclosed in some method embodiments provided in the present disclosure can be combined arbitrarily without any conflict to obtain a new method embodiment. The features disclosed in some product embodiments provided in the present disclosure can be combined arbitrarily without any conflict to obtain a new product embodiment. The features disclosed in some method or device embodiments provided in the present disclosure can be combined arbitrarily without any conflict to obtain a new method embodiment or a new device embodiment.

While the specific embodiments of the present disclosure have been described above, the protection scope of the present disclosure is not limited to these embodiments. Various variants and alternatives easily conceived by any of those skilled in the art without departing from the technical scope of the present disclosure are to be encompassed by the protection scope of present disclosure as defined by the claims as attached.

What is claimed is:

1. A content sharing method, applied in an electronic device comprising a display screen, the method comprising:
    adjusting a display mode of a first application interface in response to a moving operation on a target icon in the first application interface; and
    sharing a target content corresponding to the target icon to a first object when an end point of the moving operation corresponds to the first object, in response to ending of the moving operation,
    wherein the display mode of the first application interface at least comprises one of: a size of the first application interface, a shape of the first application interface, a morphology of the first application interface, and a position of the first application interface in the display screen,
    the method further comprises:
    cancelling sharing of the target content when a position of the end point of the moving operation is located within the first application interface, in response to the ending of the moving operation.

2. The method according to claim 1, wherein the first object is a second application; and wherein the end point of the moving operation corresponding to the first object comprises at least one of:
    a position of the end point of the moving operation being located at a position of an application icon of the second application;
    the position of the end point of the moving operation being located within an interface of the second application;
    the position of the end point of the moving operation being located at a position of a shortcut identifier of the second application; or
    the position of the end point of the moving operation being located at a position of the second application in a quick launch bar.

3. The method according to claim 1, wherein
    the first object is a display object in an interface of a second application;
    the end point of the moving operation corresponding to the first object comprises: a position of the end point of the moving operation being located at a position where the display object is located; and
    said sharing the target content corresponding to the target icon to the first object comprises: sharing the target content corresponding to the target icon to a target corresponding to the display object.

4. The method according to claim 3, wherein the second application comprises a communication application, and the display object comprises a contact identifier; and
    wherein said sharing the target content corresponding to the target icon to the target corresponding to the display object comprises: sharing the target content corresponding to the target icon to a contact corresponding to the contact identifier.

5. The method according to claim 4, wherein the contact identifier comprises at least one of a contact profile picture, a contact number, a contact chat list item, or a contact chat page.

6. The method according to claim 3, wherein the second application comprises a file management application, and the display object comprises an identifier of a file folder; and
    wherein said sharing the target content corresponding to the target icon to the target corresponding to the display object comprises: saving the target content corresponding to the target icon to a path where the file folder is located.

7. The method according to claim 2, wherein the second application comprises a document editing application; and
    wherein said sharing the target content corresponding to the target icon to the first object comprises: saving the target content corresponding to the target icon to a file in a format corresponding to the document editing application.

8. The method according to claim 1, further comprising:
    displaying the first application interface on the display screen in a mode adopted prior to said adjusting, after the sharing; or
    displaying the first application interface on the display screen in a mode adopted prior to said adjusting, after cancelling of the sharing.

9. The method according to claim 1, further comprising:
cancelling sharing of the target content when a position of the end point of the moving operation is located at a position of a title bar of the electronic device, in response to the ending of the moving operation; or
cancelling sharing of the target content when a position of the end point of the moving operation is beyond a boundary of the display screen of the electronic device, in response to the ending of the moving operation.

10. An electronic device, comprising a memory and a processor, wherein the memory has a computer program executable on the processor stored thereon, and wherein the processor, when executing the computer program, implements steps of:
adjusting a display mode of a first application interface in response to a moving operation on a target icon in the first application interface; and
sharing a target content corresponding to the target icon to a first object when an end point of the moving operation corresponds to the first object, in response to ending of the moving operation,
wherein the display mode of the first application interface at least comprises one of: a size of the first application interface, a shape of the first application interface, a morphology of the first application interface, and a position of the first application interface in a display screen,
the processor, when executing the computer program, further implements step of:
cancelling sharing of the target content when a position of the end point of the moving operation is located within the first application interface, in response to the ending of the moving operation.

11. The electronic device according to claim 10, wherein the first object is a second application; and wherein the end point of the moving operation corresponding to the first object comprises at least one of:
a position of the end point of the moving operation being located at a position of an application icon of the second application;
the position of the end point of the moving operation being located within an interface of the second application;
the position of the end point of the moving operation being located at a position of a shortcut identifier of the second application; or
the position of the end point of the moving operation being located at a position of the second application in a quick launch bar.

12. The electronic device according to claim 10, wherein the first object is a display object in an interface of a second application;
the end point of the moving operation corresponding to the first object comprises: a position of the end point of the moving operation being located at a position where the display object is located; and
said sharing the target content corresponding to the target icon to the first object comprises: sharing the target content corresponding to the target icon to a target corresponding to the display object.

13. The electronic device according to claim 12, wherein the second application comprises a communication application, and the display object comprises a contact identifier; and
wherein said sharing the target content corresponding to the target icon to the target corresponding to the display object comprises: sharing the target content corresponding to the target icon to a contact corresponding to the contact identifier.

14. The electronic device according to claim 13, wherein the contact identifier comprises at least one of a contact profile picture, a contact number, a contact chat list item, or a contact chat page.

15. The electronic device according to claim 12, wherein the second application comprises a file management application, and the display object comprises an identifier of a file folder; and
wherein said sharing the target content corresponding to the target icon to the target corresponding to the display object comprises: saving the target content corresponding to the target icon to a path where the file folder is located.

16. The electronic device according to claim 11, wherein the second application comprises a document editing application; and
wherein said sharing the target content corresponding to the target icon to the first object comprises: saving the target content corresponding to the target icon to a file in a format corresponding to the document editing application.

17. A non-transitory computer-readable storage medium, having a computer program stored thereon, wherein the computer program, when executed by a processor, implements steps of:
adjusting a display mode of a first application interface in response to a moving operation on a target icon in the first application interface; and
sharing a target content corresponding to the target icon to a first object when an end point of the moving operation corresponds to the first object, in response to ending of the moving operation,
wherein the display mode of the first application interface at least comprises one of: a size of the first application interface, a shape of the first application interface, a morphology of the first application interface, and a position of the first application interface in a display screen,
the computer program, when executed by the processor, further implements step of:
cancelling sharing of the target content when a position of the end point of the moving operation is located within the first application interface, in response to the ending of the moving operation.

* * * * *